US012602258B2

(12) United States Patent
Chen et al.

(10) Patent No.: US 12,602,258 B2
(45) Date of Patent: Apr. 14, 2026

(54) INSTANTIATING SOFTWARE DEFINED STORAGE NODES ON EDGE INFORMATION HANDLING SYSTEMS

(71) Applicant: Dell Products L.P., Round Rock, TX (US)

(72) Inventors: Xiangping Chen, Sherborn, MA (US); William Price Dawkins, Lakeway, TX (US); Walter A. O'Brien, III, Westborough, MA (US); Xunce Zhou, Harvard, MA (US)

(73) Assignee: Dell Products L.P., Round Rock, TX (US)

( * ) Notice: Subject to any disclaimer, the term of this patent is extended or adjusted under 35 U.S.C. 154(b) by 509 days.

(21) Appl. No.: 18/352,293

(22) Filed: Jul. 14, 2023

(65) Prior Publication Data

US 2025/0021394 A1 Jan. 16, 2025

(51) Int. Cl.
*G06F 9/50* (2006.01)
(52) U.S. Cl.
CPC .............. *G06F 9/5044* (2013.01); *G06F 9/50* (2013.01); *G06F 9/5005* (2013.01)
(58) Field of Classification Search
CPC ......... G06F 9/5044; G06F 9/50; G06F 9/5005
See application file for complete search history.

(56) References Cited

U.S. PATENT DOCUMENTS

| 10,708,135 | B1* | 7/2020 | Elliott, IV | .......... H04L 67/1097 |
| 10,938,900 | B1* | 3/2021 | Peterson | ................. G06F 3/067 |
| 11,163,462 | B1* | 11/2021 | Dawe | .................... G06F 3/0631 |
| 2017/0090779 | A1* | 3/2017 | Barzik | .................... G06F 3/065 |
| 2017/0286144 | A1* | 10/2017 | Barzik | ................. G06F 9/5077 |
| 2020/0136906 | A1* | 4/2020 | Guim Bernat | ........ H04L 9/3213 |
| 2020/0252271 | A1* | 8/2020 | Elliott, IV | ........... G06F 9/5016 |
| 2021/0109735 | A1* | 4/2021 | Ali | ...................... H04L 41/0886 |
| 2021/0120070 | A1* | 4/2021 | Ponce | ................. H04L 12/4641 |

(Continued)

OTHER PUBLICATIONS

Raghunath et al., "On Evolving Software Defined Storage Architecture," 2020 IEEE International Conference on Cloud Computing Technology and Science (CloudCom), Bangkok, Thailand (Year: 2000).*

(Continued)

*Primary Examiner* — Benjamin C Wu
(74) *Attorney, Agent, or Firm* — Chamberlain, Hrdlicka, White, Williams & Aughtry; Aly Z. Dossa

(57) ABSTRACT

Techniques described herein relate to a method for providing software defined storage (SDS) services on edge information handling systems (IHSs). The method includes obtaining a composition request associated with performing an SDS service on edge IHSs, wherein the SDS service is associated with a minimum quantity of SDS nodes that is greater than a quantity of available edge IHSs; identifying a first edge IHS and a second edge IHS specified by the composition request; identifying a number of nodes associated with the SDS nodes; allocating heterogeneous compute resources of the first IHS and the second IHS to each SDS node of the SDS nodes; allocating a power domain to each SDS node of the SDS nodes; allocating portions of an at least one hardware resource set to each SDS node of the SDS nodes; and preparing the SDS nodes to perform the SDS service.

20 Claims, 12 Drawing Sheets

(56)  References Cited

U.S. PATENT DOCUMENTS

| | | | |
|---|---|---|---|
| 2022/0198034 A1* | 6/2022 | Rodriguez | H04L 9/008 |
| 2022/0404790 A1* | 12/2022 | Amaro, Jr. | H04L 43/20 |
| 2023/0195373 A1* | 6/2023 | Pabón | G06F 3/0604 |
| | | | 711/154 |
| 2023/0229341 A1* | 7/2023 | Chen | G06F 3/0655 |
| | | | 711/113 |
| 2023/0409207 A1* | 12/2023 | Nakamura | G06F 3/067 |
| 2024/0103898 A1* | 3/2024 | Tal | G06F 12/0868 |
| 2024/0220101 A1* | 7/2024 | Trudel | G06F 3/0631 |
| 2025/0117300 A1* | 4/2025 | Fitzpatrick | G06F 11/1484 |
| 2025/0240253 A1* | 7/2025 | Dawkins | H04L 41/0897 |
| 2025/0370803 A1* | 12/2025 | Darji | G06F 16/00 |

OTHER PUBLICATIONS

Al-Badarneh et al., "Software Defined Storage for cooperative Mobile Edge Computing systems," 2017 Fourth International Conference on Software Defined Systems (SDS), Valencia, Spain (Year: 2017).*

\* cited by examiner

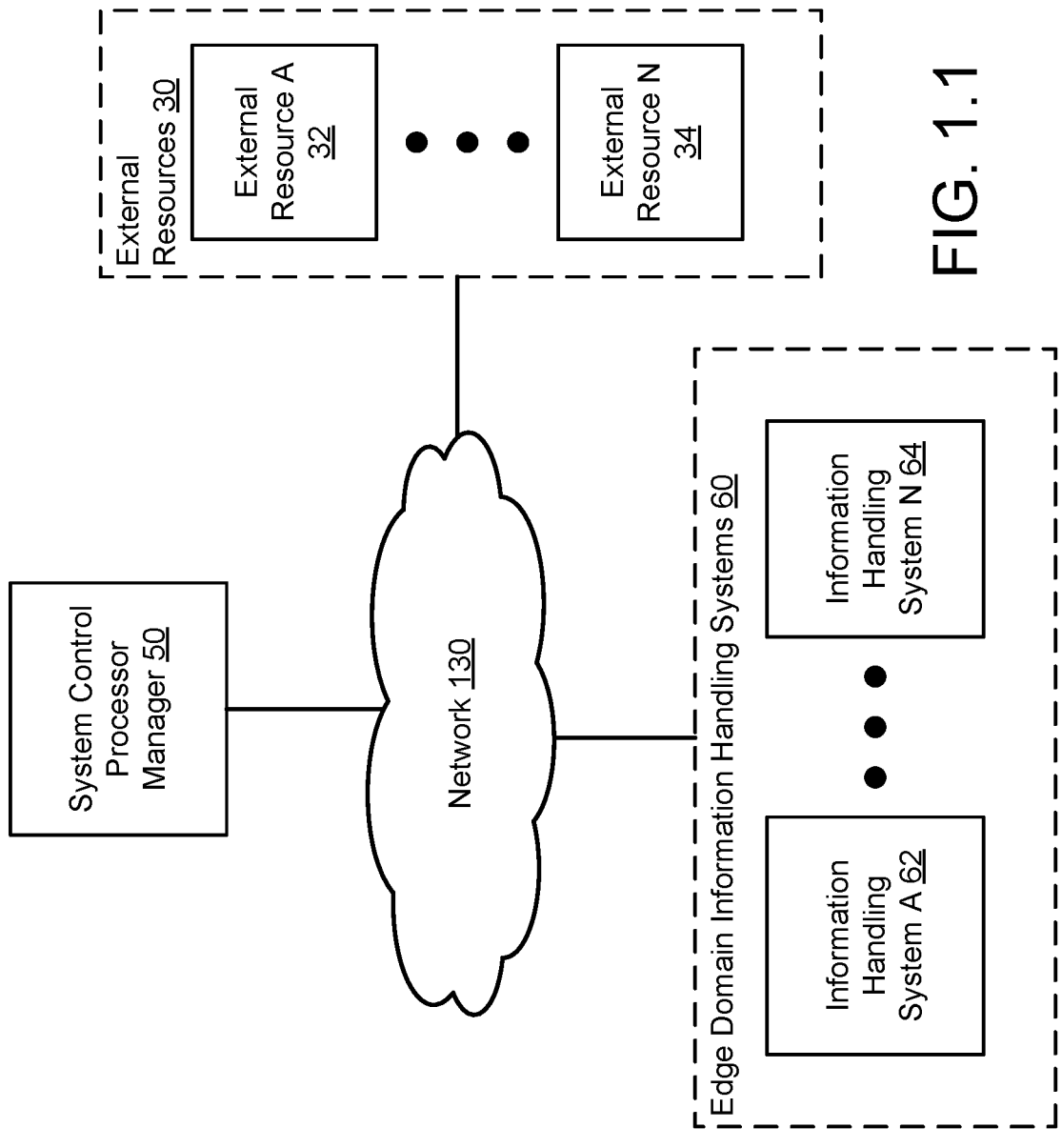
FIG. 1.1

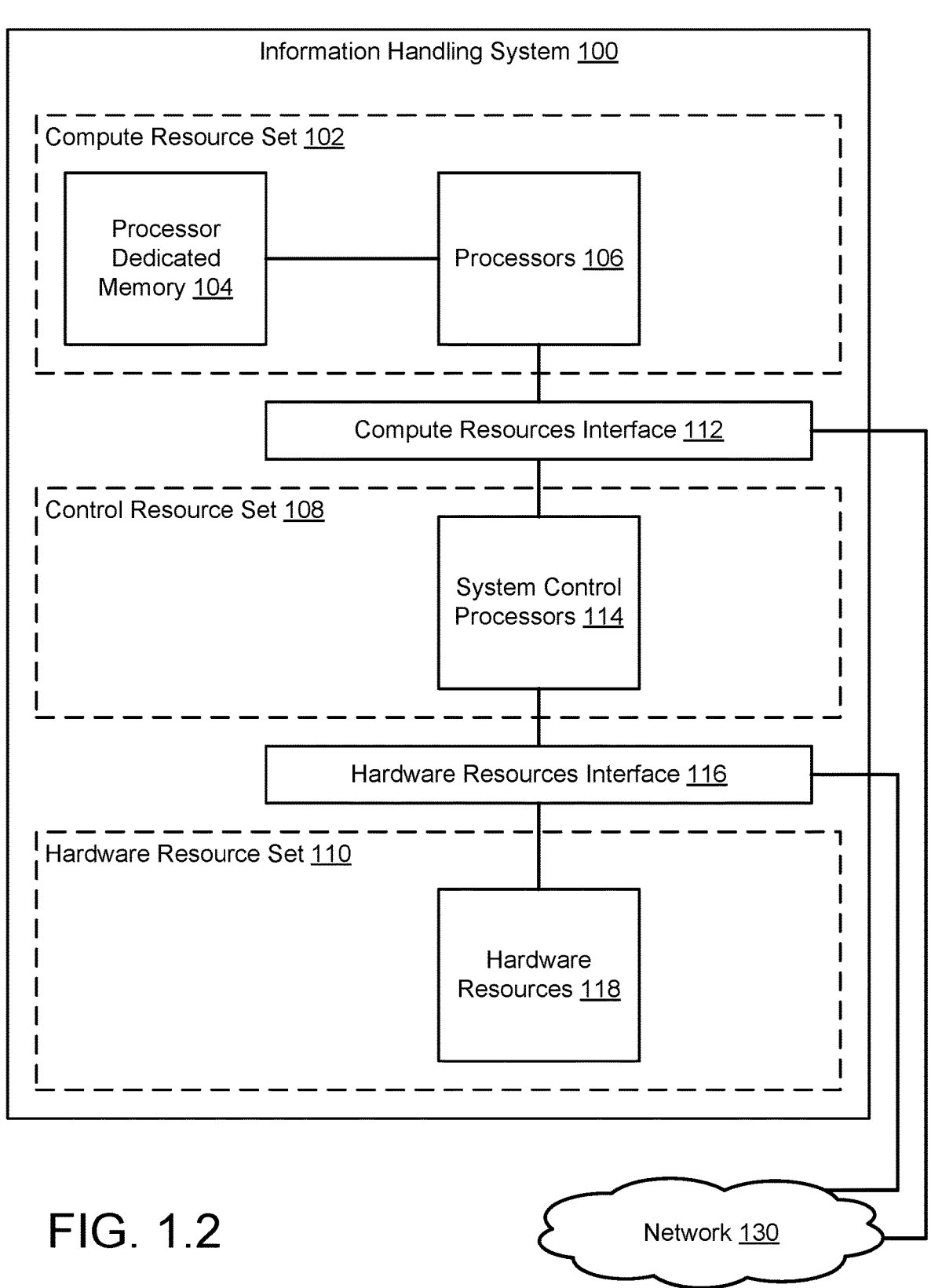
FIG. 1.2

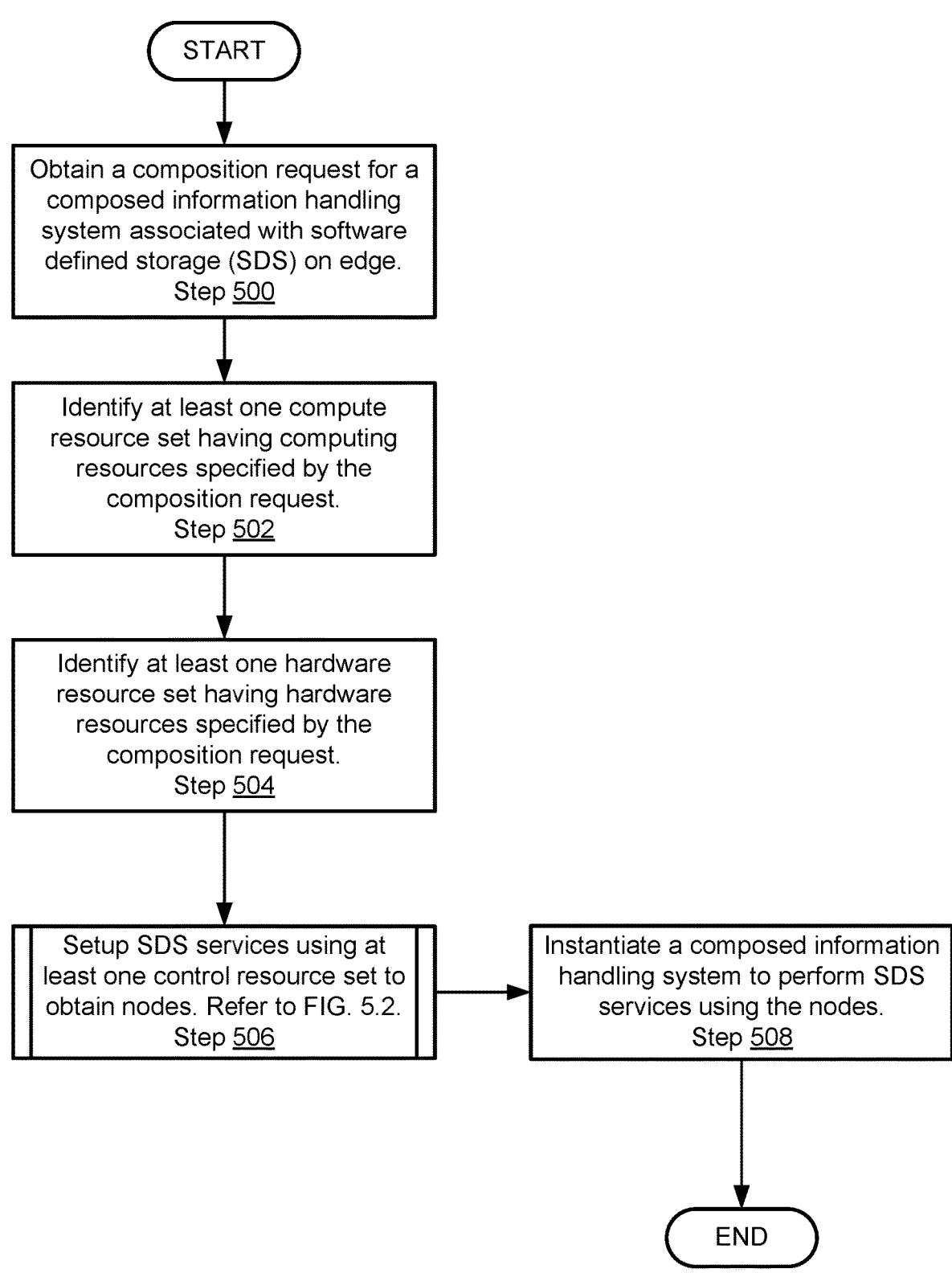
FIG. 5.1

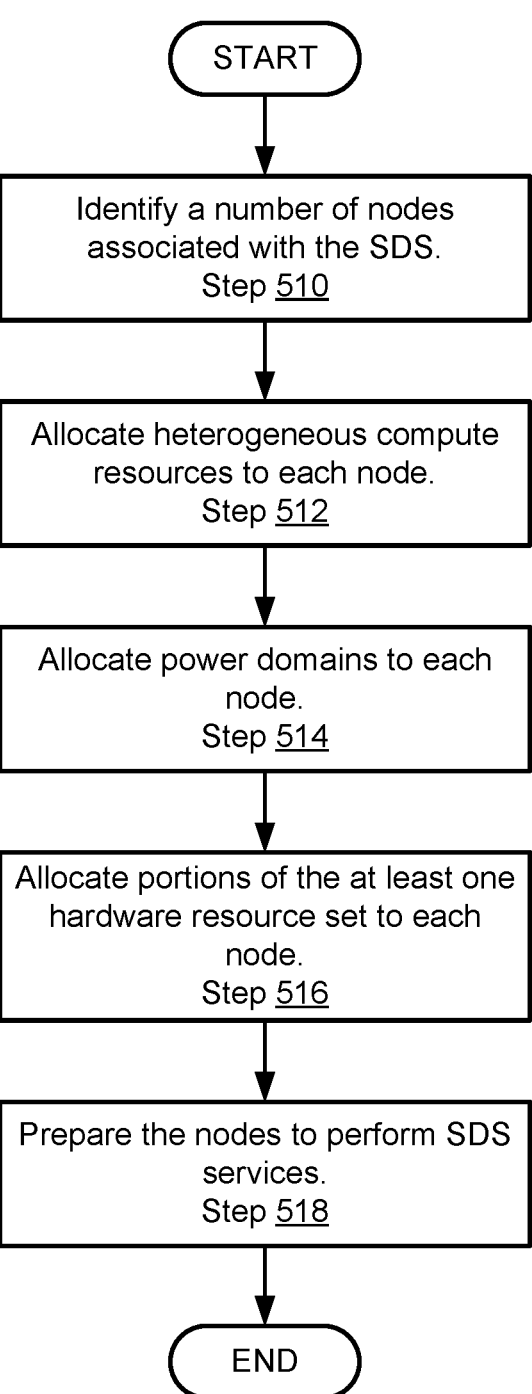
FIG. 5.2

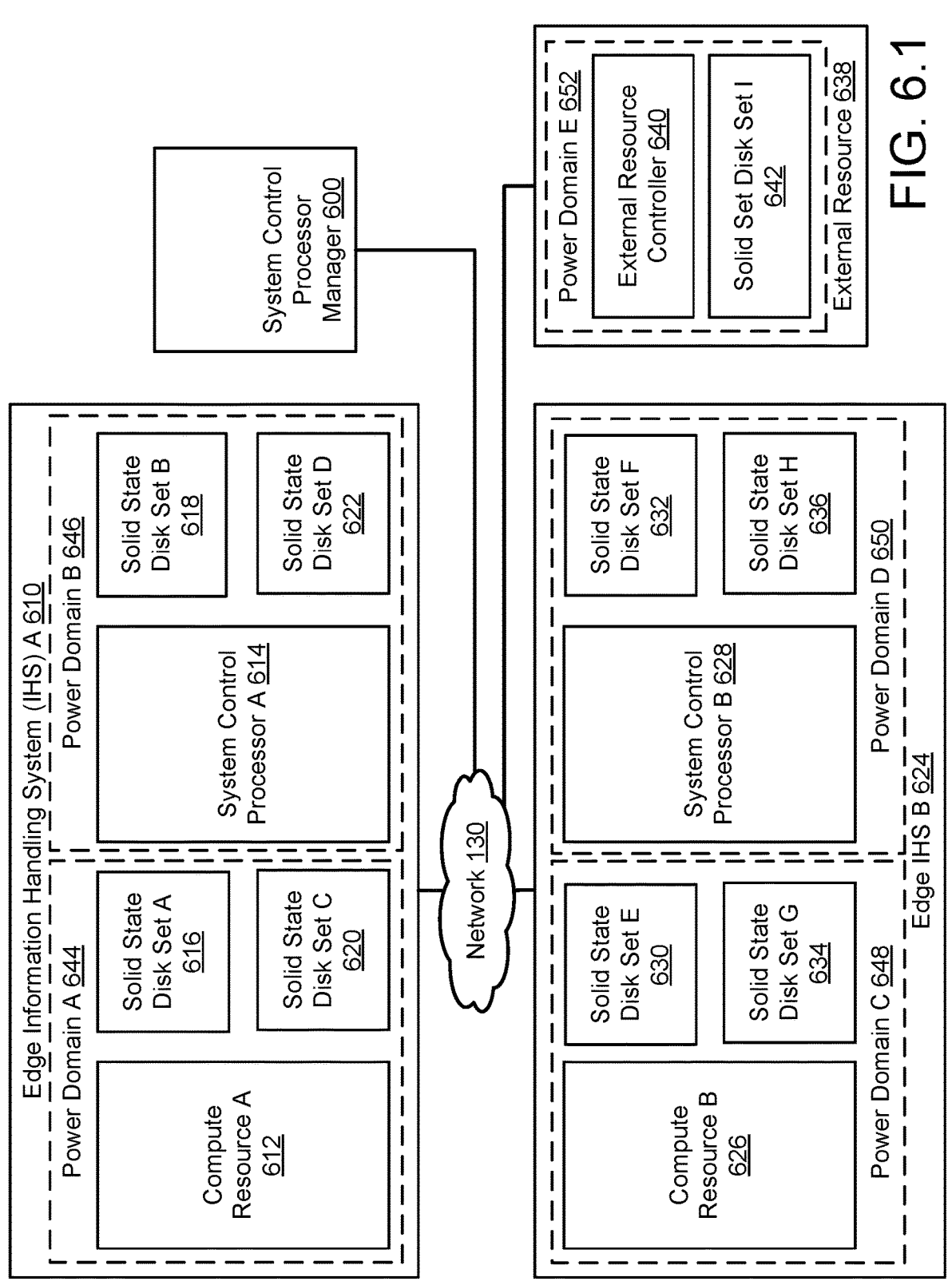
FIG. 6.1

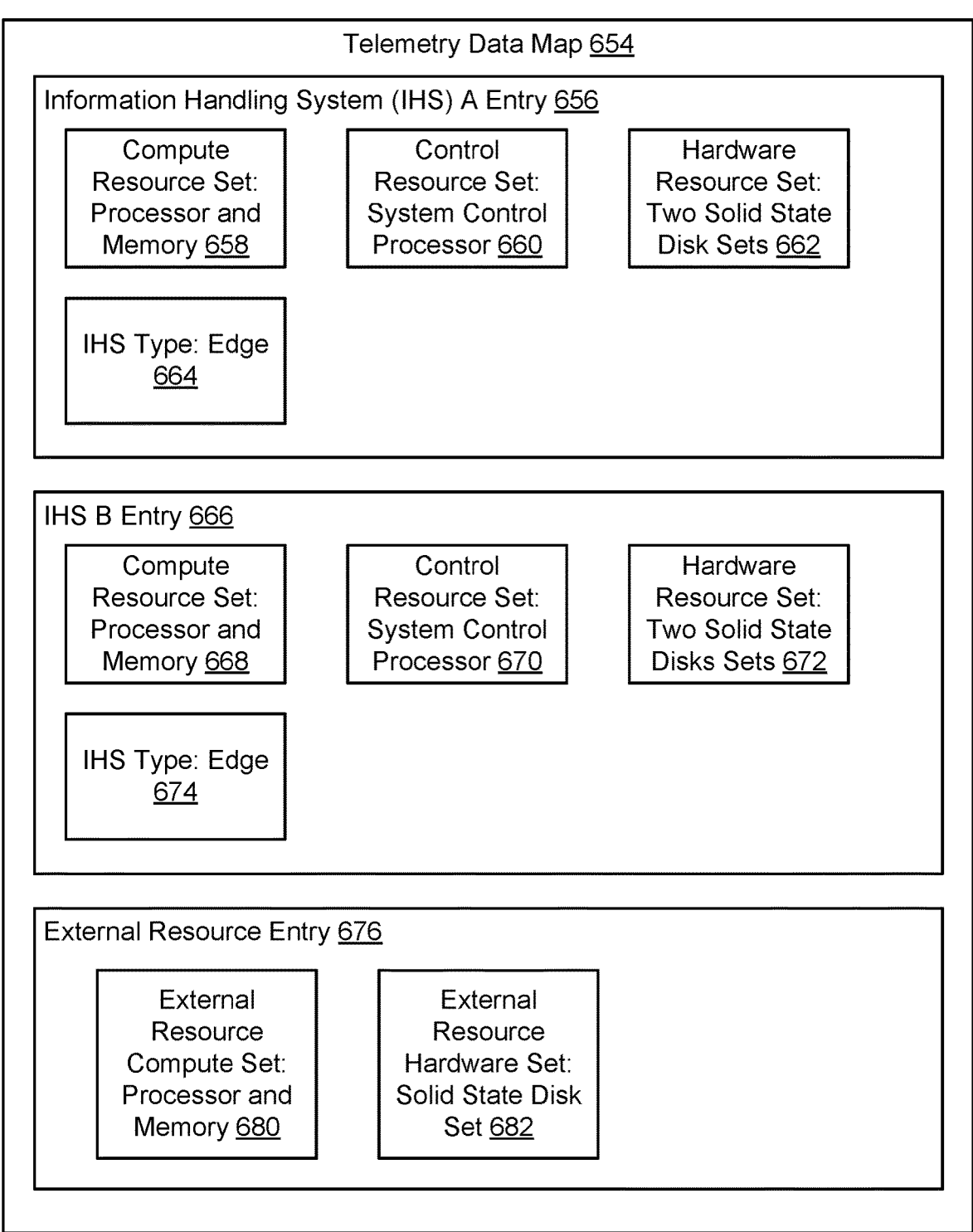
FIG. 6.2

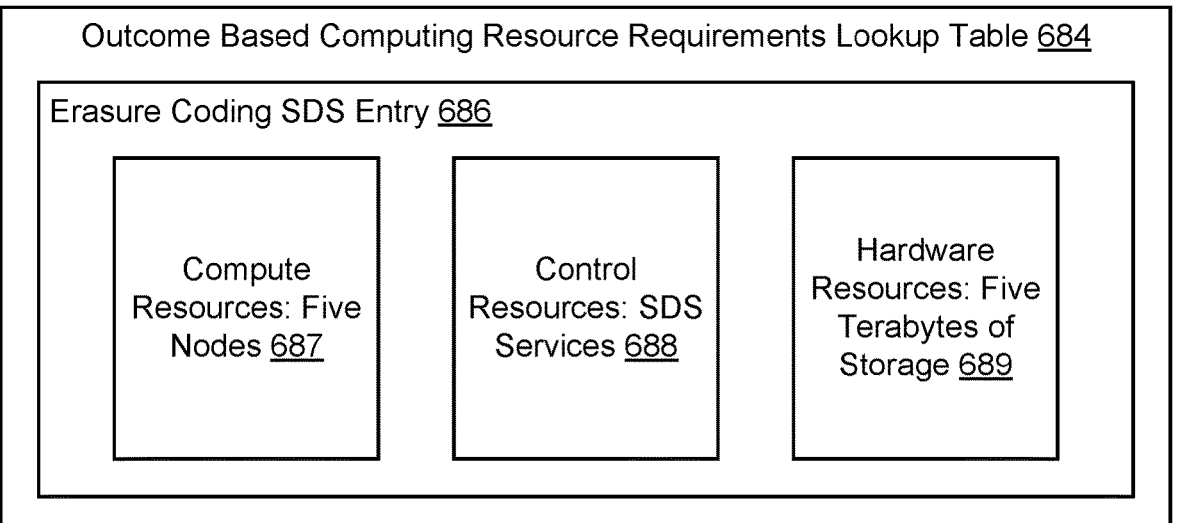
FIG. 6.3

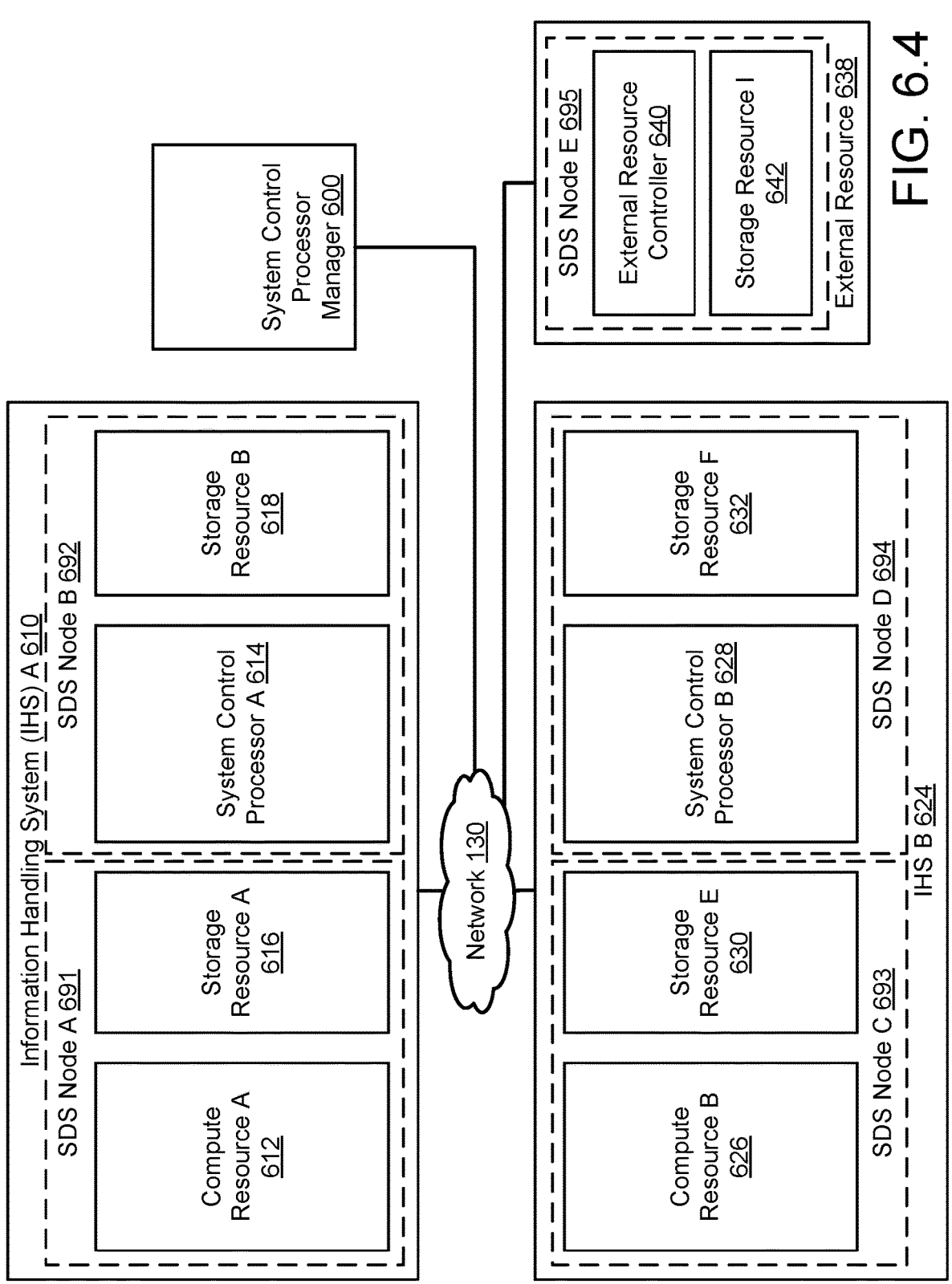
FIG. 6.4

700

INSTANTIATING SOFTWARE DEFINED STORAGE NODES ON EDGE INFORMATION HANDLING SYSTEMS

BACKGROUND

Computing devices may provide services. To provide the services, the computing devices may include hardware components and software components. The services provided by the computing devices may be limited by these components. The services may require specific components and/or component configurations.

SUMMARY

In general, certain embodiments described herein relate to a method for providing software defined storage services on edge information handling systems. The method may include obtaining a composition request for a composed information handling system (IHS) associated with performing a software defined storage (SDS) service on edge IHSs, wherein: the composition request specifies the SDS service, and the SDS service is associated with a minimum quantity of SDS nodes that is greater than a quantity of available edge IHSs; identifying a first IHS and a second IHS specified by the composition request, wherein the first IHS and the second IHS comprise edge IHSs; setting up SDS services using the first IHS and the second IHS to obtain SDS nodes, wherein setting up SDS services to obtain SDS nodes comprises: identifying a number of nodes associated with the SDS nodes; allocating heterogeneous compute resources of the first IHS and the second IHS to each SDS node of the SDS nodes; allocating a power domain to each SDS node of the SDS nodes; allocating portions of an at least one hardware resource set to each SDS node of the SDS nodes; and preparing the SDS nodes to perform the SDS service; and instantiating a composed information handling system to perform the SDS service using the SDS nodes.

In general, certain embodiments described herein relate to a system for providing software defined storage services on edge information handling systems. The system includes a processor that executes an application and a system control processor manager. The system includes a processor and memory and is programmed to obtain a composition request for a composed information handling system (IHS) associated with performing a software defined storage (SDS) service on edge IHSs, wherein: the composition request specifies the SDS service, and the SDS service is associated with a minimum quantity of SDS nodes that is greater than a quantity of available edge IHSs; identify a first IHS and a second IHS specified by the composition request, wherein the first IHS and the second IHS comprise edge IHSs; set up SDS services using the first IHS and the second IHS to obtain SDS nodes, wherein setting up SDS services to obtain SDS nodes comprises: identifying a number of nodes associated with the SDS nodes; allocating heterogeneous compute resources of the first IHS and the second IHS to each SDS node of the SDS nodes; allocating a power domain to each node of the nodes; allocating portions of an at least one hardware resource set to each SDS node of the SDS nodes; and preparing the SDS nodes to perform the SDS service; and instantiate a composed information handling system to perform the SDS service using the SDS nodes.

In general, certain embodiments described herein relate to a non-transitory computer readable medium that includes computer readable program code, which when executed by a computer processor enables the computer processor to perform a method for providing software defined storage services on edge information handling systems. The method may include obtaining a composition request for a composed information handling system (IHS) associated with performing a software defined storage (SDS) service on edge IHSs, wherein: the composition request specifies the SDS service, and the SDS service is associated with a minimum quantity of SDS nodes that is greater than a quantity of available edge IHSs; identifying a first IHS and a second IHS specified by the composition request, wherein the first IHS and the second IHS comprise edge IHSs; setting up SDS services using the first IHS and the second IHS to obtain SDS nodes, wherein setting up SDS services to obtain SDS nodes comprises: identifying a number of nodes associated with the SDS nodes; allocating heterogeneous compute resources of the first IHS and the second IHS to each SDS node of the SDS nodes; allocating a power domain to each SDS node of the SDS nodes; allocating portions of an at least one hardware resource set to each SDS node of the SDS nodes; and preparing the SDS nodes to perform the SDS service; and instantiating a composed information handling system to perform the SDS service using the SDS nodes.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method for instantiating a composed information handling system based on an intent based composition request using edge information handling systems in accordance with one or more embodiments of the invention.

FIG. 5.2 shows a flowchart of a method for setting up software defined storage services in accordance with one or more embodiments of the invention.

FIGS. 6.1-6.4 shows diagrams of the operation of an example system over time in accordance with one or more embodiments of the invention.

DETAILED DESCRIPTION

Figure 2:
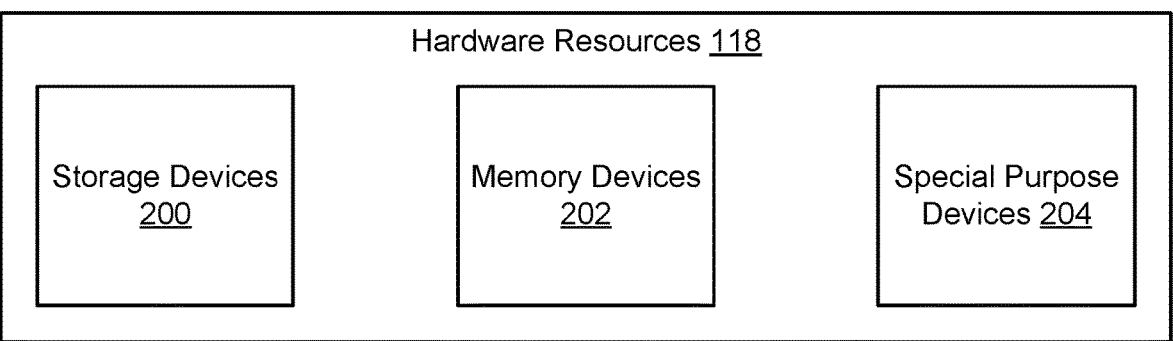
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing software defined storage (SDS) services directed at providing high availability and fault tolerance for data generated by applications executing in composed information handling systems in edge domains.

To provide SDS services, computing resources may need to be allocated for the performance of the services. SDS services may require an SDS cluster that includes multiple SDS nodes. An SDS cluster providing high availability data storage services may typically require a minimum of three nodes, or a minimum of two nodes with an independent arbitrator node, to avoid a "split-brain" problem. Each SDS node may further require separate resources on separate power domains to maintain high data availability and power fault tolerance. The resources may include, for example, memory resources, storage resources, computing resources, etc. Each information handling system (IHS) may include its own memory resources, storage resources, computing resources, etc. In traditional systems, a separate information handling system may be allocated as a separate SDS node, with multiple information handling systems each acting as an SDS node of the SDS cluster. For example, if an SDS service requires an SDS cluster that includes three SDS nodes, three separate information handling systems may each be allocated as a separate SDS node to for the SDS cluster. As a result, the SDS services of the SDS cluster will execute on the three information handling systems in adherence to the SDS node requirements.

However, problems may arise when attempting to provide the aforementioned SDS services in an edge domain using the traditional methods described above. An edge domain may include: (i) a limited capacity and/or a limited availability of information handling systems for providing the SDS services, and (ii) the information handling systems of the edge may include a limited number of form factors that each may include a limited quantity of resources to allocate to perform workloads. Said another way, the edge domain may not include enough information handling systems, may not include enough computing resources in each information handling system, and/or may not include enough available information handling systems to traditionally allocate separate information handling systems to act as separate SDS nodes to form a proper SDS cluster as required by the SDS service.

For example, an edge domain may include only two information handling systems or may only include two information handling systems that are available (e.g., other information handling systems in the edge domain executing other workloads). A user of the edge domain may desire to implement an SDS service on the edge domain that requires an SDS cluster that includes three SDS nodes by traditionally allocating separate information handling systems to act as each SDS node. However, because the edge domain only includes two available information handling systems, the user would either be forced to abandon the effort due to the lack of available information handling systems, wait for other information handling systems in the edge domain to come available, spend time and money to deploy additional information handling systems in the edge domain, or spend time and money allocating the SDS services in a different domain to satisfy the minimum node requirements of the SDS service. Such options may be extremely burdensome on the user of the edge domain.

To address, at least in part, the aforementioned issues, embodiments disclosed herein relate to providing SDS cluster deployment on edge IHSs by leveraging the heterogeneous compute resources of the edge IHSs to instantiate the required number of SDS nodes of an SDS cluster on edge domains to provide SDS services. More specifically, compute resources, control resources, and hardware resources of a single edge IHS may be allocated to separate SDS nodes in an SDS cluster with each SDS node associated with a separate power domain to maintain fault tolerance. Furthermore, external resources may also be allocated to instantiate additional nodes of an SDS cluster in a composed information handling system. As a result, the limitations of limited available information handling systems and the constrained form factors associated with the information handling systems in an edge domain may be overcome to provide SDS services in the edge domain in accordance with the minimum node requirements.

To allocate the computing resources to perform SDS services in an edge domain, composed information handling systems may be instantiated. A composed information handling system may be a device (the components of which may be distributed across one or more information handling systems in an edge domain) that has exclusive use over a quantity of computing resources to perform SDS services. Computing resources from one or multiple information handling systems may be allocated to a composed information handling system thereby enabling a composed information handling system to utilize computing resources from any number of information handling system for performance of SDS services.

To allocate computing resources, the system may include a system control processor manager. The system control processor manager may obtain composition requests. The composition requests may indicate a desired outcome such as, for example, providing SDS services, execution of one or more applications, providing of our or more services, etc.

The system control processor manager may translate the composition requests into corresponding quantities of computing resources necessary to be allocated to satisfy the intent of the composition requests (e.g., allocate computing resources to instantiate SDS nodes to form the required SDS cluster associated with the SDS service).

Once the quantities of computing resources are obtained, the system control processor manager may allocate resources of the information handling system to meet the identified quantities of computing resources by instructing system control processors of the information handling systems to allocate heterogeneous compute resources and hardware resources sets of the information handling systems to form SDS nodes of the SDS cluster.

Additionally, during the preparation of the hardware resource sets, the system control processor manager may instruct the system control processors to prepare the heterogeneous compute resources to act as SDS nodes and perform SDS services. Furthermore, the system control processor manager may instantiate SDS nodes to collectively provide the SDS services.

FIG. 1.1 shows a system in accordance with one or more embodiments of the invention. The system may include any number of edge domain information handling systems (IHSs) (60). The edge domain information handling systems (60) may provide computer implemented services. The computer implemented services may include, for example, database services, data storage services, electronic communications services, software defined storage services, data protection services, data processing services, machine learning model training services, inferencing services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services, portions of services, and/or subservices that form the cooperatively provided service).

To provide computer implemented services, the edge domain information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

Performing the computer implemented services may result in the generation of data. The data may be may be important to the system and/or a user or the system and may be required to be stored for protection and/or restoration purposes. The data may be stored for other and/or additional purposes without departing from the invention. Storing the data in the hardware devices of the system may be problematic because hardware devices may fail and hardware devices may be limited in terms of availability. The failure of hardware device may result in data loss and/or data corruption. As a result, the edge domain information handling systems (60) may be allocated and instantiated as SDS nodes of an SDS cluster and perform SDS services to provide high data availability and power fault tolerance.

In general, embodiments disclosed herein relate to systems, methods, and devices for managing the hardware resources of the edge domain information handling systems (60) and/or other resources (e.g., external resources (30)) on the edge to provide SDS services for data generated by the system. The hardware resources of the edge domain information handling systems (60) may be managed by instantiating one or more composed information handling systems using the hardware resources of the edge domain information handling systems (60), external resources (30), and/or other types of hardware devices operatively connected to the edge domain information handling systems (60). During the instantiation of the composed information handling systems, SDS nodes of an SDS cluster, including a system control processor and other processors of compute resources, may be automatically setup to perform SDS services for the composed information handling system, including performing erasure coding, replication, mirroring, etc. on application data, maintaining high data availability and power fault tolerance on edge IHSs. Consequently, SDS services may be provided to the composed information handling systems on edge IHSs that may result in efficient, reliable, storage of application data on edge domain information handling systems (60), thereby circumventing the resource constraints associated with edge domains.

In one or more embodiments of the invention, the system includes a system control processor manager (50). The system control processor manager (50) may provide composed information handling system composition services. Composed information handling system composition services may include (i) obtaining composition requests for composed information handling systems that perform SDS services and (ii) aggregating computing resources from the edge domain information handling systems (60) and/or external resources (30) using system control processors to service the composition requests by instantiating composed information handling systems with the required SDS nodes of an SDS cluster in accordance with the requests. By doing so, instantiated composed information handling systems may provide SDS services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy SDS services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, a composed information handling system is a device that is formed using all, or a portion, of the computing resources of the edge domain information handling systems (60), the external resources (30), and/or other types of hardware devices operatively connected to the edge domain information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the edge domain information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems. Additionally, the system control processors may be allocated as one of the heterogeneous compute resources to form SDS nodes of an SDS cluster as discussed below in FIG. 5.2.

While the edge domain information handling systems (60) have been illustrated and described as including a limited number of specific components, an information handling system in accordance with embodiments of the invention may include additional, fewer, and/or different components without departing from the invention. For additional details regarding the edge domain information handling systems (60), refer to FIG. 1.2.

The external resources (30) may be provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

The system of FIG. 1.1 may include any number of information handling systems (e.g., 62, 64), any number of external resources (e.g., 32, 34), and any number of system control processor managers (e.g., 50). Any of the components of FIG. 1.1 may be operatively connected to any other component and/or other components not illustrated in FIG. 1.1 via one or more networks (e.g., 130). The networks may be implemented using any combination of wired and/or wireless network topologies.

The system control processor manager (50), edge domain information handling systems (60), and/or external resources (30) may be implemented using computing devices. The computing devices may include, for example, a server, laptop computer, a desktop computer, a node of a distributed system, a cloud resource, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), edge domain information handling systems (60), and/or external resources (30) described in this application and/or all, or a portion, of the methods illustrated in FIGS. 5.1-5.2. The system control processor manager (50), edge domain information handling systems (60), and/or external resources (30) may be implemented using other types of computing devices without departing from the invention. For additional details regarding computing devices, refer to FIG. 7.

The system control processor manager (50), edge domain information handling systems (60), and/or external resources (30) may exist on different types of domains. These domains may include edge domains, core domains, and cloud domains. The system may include any number of edge domains, which may be operatively connected to any number of core domains, which may, in turn, be operatively connected to one or more cloud domains. Additionally, a given system domain topology may have more or less layers without departing from the scope of embodiments described herein. For example, an edge domain may be operatively connected to a cloud domain without an intervening core domain. As another example, there may be only edge domains and core domains in the system domain topology. One of ordinary skill in the art will recognize that there are many possible arrangements of the domain topology.

In one or more embodiments disclosed herein, each domain in the domain topology includes a device set (also referred to herein as a form factor). In one or more embodiments, each device set is a set of computing devices (e.g., an IHS or an external resource), such as is discussed above in the description of IHSs and external resources. However, the set of computing devices in different device sets may be different, and may be particular to the type of domain (e.g., edge, cloud, and core) that the device set is in. For example, an edge domain may include a very limited amount information handling systems (e.g., 62, 64) each with a device set that includes a very limited amount of resources, such as a few servers that only include a limited number of compute resources and hardware resources. Other domains may include different computing devices. For example, a core domain may include more powerful (e.g., having more form factors with more compute resources) devices (e.g., information handling systems), a greater quantity of more powerful devices, specific architectures of sets of devices for performing certain tasks, etc. Also similarly, a cloud domain may include still more and different devices configured and deployed in different ways than the other types of domains.

Moreover, the domains may be arranged based on geographical locations and/or geographical regions. In other words, a cloud domain may include a device set that is associated with and/or physically spans a geographical region. A core domain operatively connected to the cloud domain may include a device set that is associated with and/or physically spans a portion of the geographical region associated with the cloud domain. An edge domain operatively connected to the core domain may include a device set that is associated with and/or physically spans a particular location within the portion of the geographical region associated with the core domain. As a simple example, a cloud domain may be associated with the entirety of North America, a core domain operatively connected to the cloud domain may be associated with the United States of America, and an edge domain may be associated with a warehouse located in New York City, New York. For additional discussion regarding the edge domain, refer to FIG. 1.2.

Turning to FIG. 1.2, FIG. 1.2 shows a diagram of an information handling system (100) in accordance with one or more embodiments of the invention. Any of the edge domain information handling systems (e.g., 60) of FIG. 1.1 may be similar to the information handling system (100) illustrated in FIG. 1.2.

As discussed above, the information handling system (100) may provide any quantity and type of computer implemented services. In one or more embodiments disclosed herein, the information handling system may be used to instantiate one or more a composed information handling system that includes the required quantity of SDS nodes to perform SDS services. The composed information handling systems may provide the SDS services.

To provide computer implemented services including the SDS services, the information handling system (100) may include limited number of any type of hardware devices including, for example, a limited number of processors (106), a limited quantity and type of processor dedicated memory (104), a limited number of system control processors (114), and a limited number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform SDS services as a part of an SDS node in conjunction with other SDS nodes. To do so, the control resource set (108) may prepare any quantity of resources from any number of hardware resource sets (e.g., 110) (e.g., of the information handling system (100) and/or other information handling systems) for allocation to processing resources of any number of compute resource sets (e.g., 102) and/or the control resource set (e.g., 108) (e.g., of the information handling system (100) and/or other information handling systems). Once prepared, the control resource set (108) may instantiate one or more SDS nodes using the allocated resources. By doing so, a composed information handling system may be instantiated to perform SDS services. To prepare the resources of the hardware resource sets for allocation, the control resource set (108) may employ, for example, virtualization, indirection, abstraction, and/or emulation.

The compute resource set (102) may include a limited quantity of processors (106) operatively connected to the processor dedicated memory (104). Consequently, the compute resource set (102) may host executing processes thereby enabling workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operatively connected to one or more system control processors (114) of the control resource set (108). For example, the processors (106) may be connected to a compute resource interface (112), which is also connected to the system control processors (114).

The system control processors (114) may present any number of resources operatively connected to it (e.g., the hardware resource set (110), other resources operatively connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operatively connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operatively connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operatively connected to external resources via hardware resources interface (116) and network (130). The system control processors (114) may prepare and present the external resources as bare metal resources to the compute resource set (102).

Figure 3:
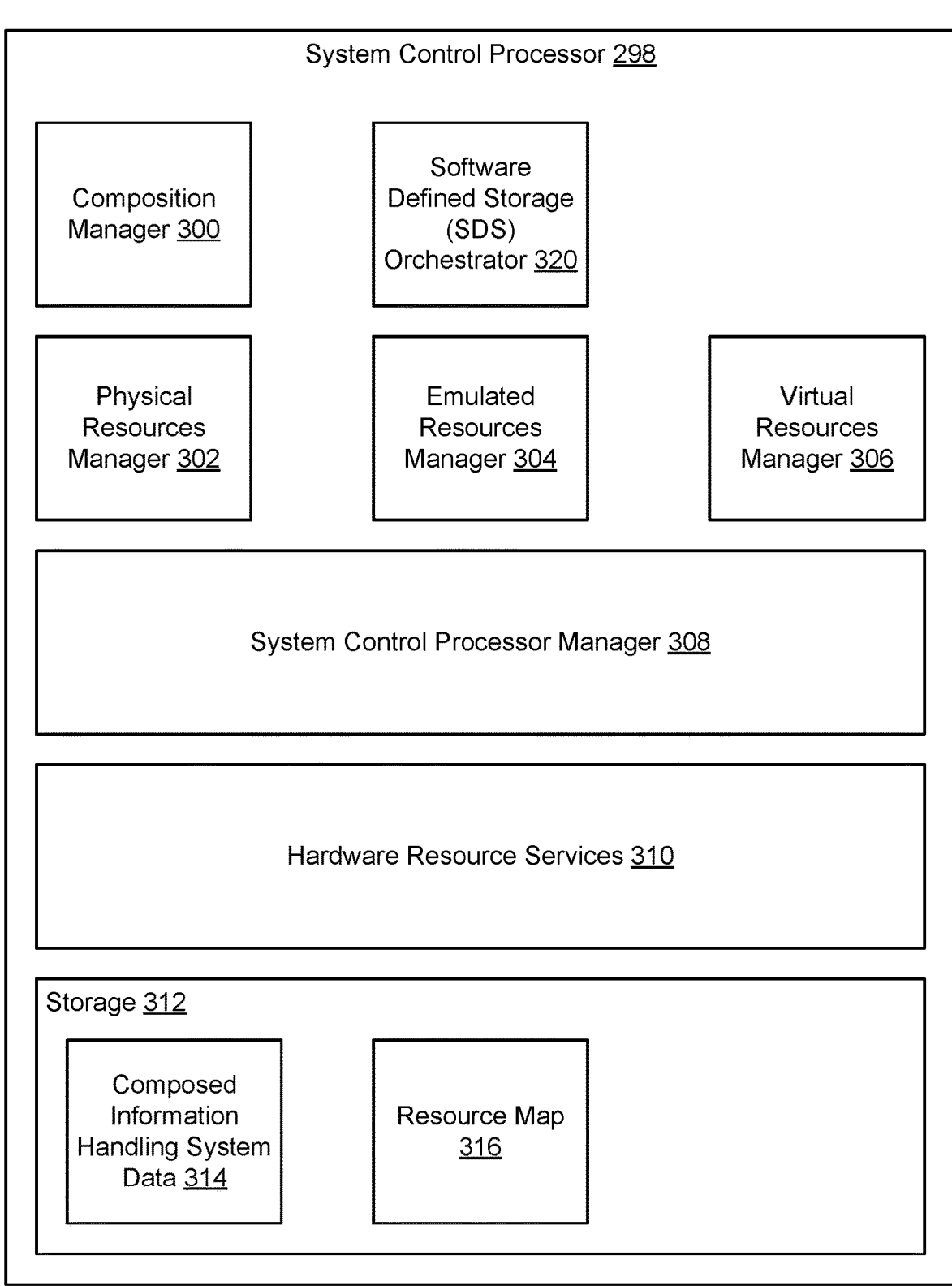
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

The network (130) may correspond to any type of network and may be operatively connected to the Internet or other networks thereby enabling the information handling system (100) to communicate with any number and type of other devices.

As discussed above, the information handling system (100) may be deployed in an edge domain. As a result, the information handling system (100) may include a limited quantity of the aforementioned resources discussed above. Accordingly, the information handling system may include a limited number of processors (106) and processor dedicated memory (104), system control processors (114), and hardware resources (118). For example, the information handling system (100) may only include a single processor (e.g., 106), a single system control processor (114), and a few hardware resources (e.g., two storage drives).

In addition to including a limited quantity of devices, the devices of the information handling system (100) may be separated in different power domains (e.g., powered by different power supplies. Continuing with the example discussed above, the processor (e.g., 106) and the first storage drive may be powered by a first power supply in a first power domain while the system control processor (e.g., 114) and the second storage drive may be powered by a second power supply in a second power domain. Accordingly, when allocated to separate SDS nodes, the resources of the information handling system (100) may maintain power fault tolerance. That is, when one power supply fails, the other will not be affected.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.2. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram the hardware resources (118) in accordance with one or more embodiments of the invention. As noted above, system control processors of information handling system may present resources including, for example, some of the hardware resources (118) to form a composed information handling system.

The hardware resources (118) may include a limited number of any type of hardware device that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may write data chunks to the storage devices (200). The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers, nonvolatile memory express (NVMe) controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including data protection models. The models may include other models such as, for example, security models, workload performance availability models, reporting models, etc. The SDS models may include performing SDS services for data generated by the composed information handling system.

In one or more embodiments of the invention, the SDS services include performing implementing an SDS cluster of SDS nodes to protect data generated by applications executing on a composed information handling system or operatively connected to the composed information handling system. The SDS services are further described below.

To perform the aforementioned SDS services, during the instantiation of a composed information handling system, the system control processor manager may prepare SDS nodes of an SDS cluster using system control processors, processors of edge IHS, and/or external resources to provide the SDS services. The system control processor manager may instruct the one or more system control processors and compute resources to perform the SDS services using the SDS nodes.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems and perform SDS services. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide SDS services to the composed information handling system.

To instantiate and operate composed information handling systems, the system control processor (298) may include a composition manager (300), a physical resources manager (302), an emulated resources manager (304), a virtual resources manager (306), a software defined storage (SDS) orchestrator (320), an system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as to allocate as SDS nodes, (v) instantiate applications in composed information handling systems to cause the composed information handling systems to provide computer implemented services, conform their operation to security models, etc., (vi) manage the operation of the composed information handling systems by, for example, providing SDS services using SDS nodes of an SDS cluster, (vii) add/remove/modify resources presented to the compute resource sets of composed information handling systems dynamically in accordance with workloads being performed by the composed information handling systems, and/or (viii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components of the information handling system that may be allocated to form composed information handling systems.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems (including a SDS node applications), security models to be employed by the composed information handling systems, communication models to be employed by the composed information handling systems, SDS services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operatively connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned SDS services, the system control processor (298) may include the SDS orchestrator (320). As discussed above, the system control processor (298) may be allocated to an SDS node. The SDS orchestrator may include the functionality to perform SDS services in conjunction with other SDS nodes. The SDS services may include (i) performing one or more SDS functionalities that may include, but not be limited to, erasure coding (e.g., generating chunks of data, generating parity chunks, etc.), replicating data, mirroring data, storing data in hardware resources according to an SDS service, rebuilding data, etc. The SDS services may include other and/or additional types of SDS services (e.g., erasure coding, replication, etc.) without departing from the invention. Other components of the system control processor (298) (e.g., composition manager (300)) may perform all, or a portion, of the SDS services without departing from the invention.

The functionalities of the physical resources manager (302), emulated resources manager (304), virtual resources manager (306), and the SDS orchestrator (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the SDS orchestrator (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the SDS orchestrator (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIGS. 5.1-5.2.

The system control processor (298) may be implemented using computing devices. The computing devices may be, for example, an embedded computing device such a system on a chip, a processing device operatively coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.2. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), SDS orchestrator (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), SDS orchestrator (320), system control processor manager (308), and/or hardware resource services (310). The composition manager (300), physical resources manager (302), emulated resources manager (304), virtual resources manager (306), SDS orchestrator (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), SDS orchestrator (320), system control processor manager (308), and/or hardware resource services (310) are implemented using a processor adapted to execute computing code stored on a persistent storage (e.g., as part of the system control processor (298) or operatively connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), SDS orchestrator (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314) and a resource map (316). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

While illustrated in FIG. 3 as being stored locally on the storage (312) of the system control processor (298), the composed information handling system data (314) and resource map (316) may be stored remotely and may be distributed across any number of devices including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
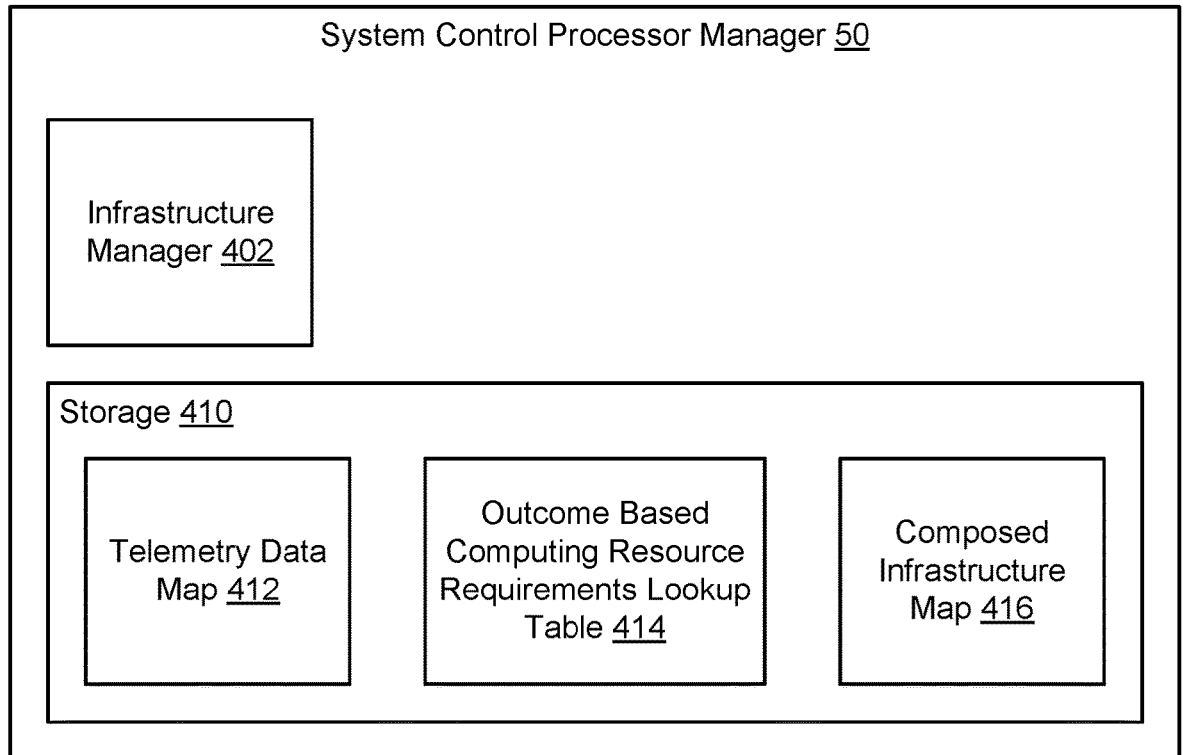
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services. Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402 may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.2.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5.1 shows a method that may be performed by components of the system of FIG. 1.1 to manage composed information handling systems.

FIG. 5.1 shows a flowchart of a method in accordance with one or more embodiments disclosed herein. The method depicted in FIG. 5.1 may be performed to provide software defined storage services using a composed information handling system in accordance with one or more embodiments disclosed herein. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the embodiments disclosed herein.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system associated with software defined storage on the edge is obtained. The composition request may be obtained using any method without departing from the invention. For example, the composition request may be obtained as part of a message from another entity operatively connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The composition request may further specify what type of IHS that should be used to service the composition request. In one or more embodiments, the composition request may specify that the composition request is to be satisfied using edge IHSs. The list of computing resources may include computing resources to be used to provide SDS services.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that SDS services are to be provided to the computing resources of the composed information handling system. The SDS services may include performing replication, RAID, data mirroring, erasure coding and/or other and/or additional types of SDS services on data generated by applications executing on, or operatively connected to, the composed information handling system without departing from embodiments disclosed herein. Other services such as deduplication and/or compression may be performed on data generated by the aforementioned applications executing in, or operatively connected to, the composed information handling system. The methods employed by the system control processors, or a portion thereof, may be transparent to the composed information handling systems because the resources may be presented to the compute resource sets of the composed information handling systems as bare metal resources while the system control processors provide the management functionality. In other words, the applications executing on the composed information handling system may not be aware of all, or a portion, of the SDS services performed by the composed information handling system.

In one or more embodiments of the invention, the composition request includes a list of applications to be hosted by the composed information handling system. The list may include any type and quantity of applications without departing from embodiments disclosed herein.

The composition request may also specify the identities of one or more system control processors hosted by other devices (e.g., IHSs). In some scenarios, as noted above, resources from other information handling systems may be used to form a composed information handling system. The identifiers of the system control processors of these other information handling systems may be used to form operative connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request. In another example, the desired outcome may be a list of applications to be hosted in response to the composition request and that SDS services are to be performed for the applications. In other words, the composition request may specify a desired outcome without specifying the resources that are to be used to satisfy the requests, the methods of managing the resources, models employed to provide for data protection/integrity/security/etc. Such a composition request may be referred to as an intent based composition request.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, the hardware devices of the listed compute resource sets, the type of IHS associated with the compute resource sets (e.g., client, edge, core, cloud), and characteristics and information regarding the compute resource set (e.g., memory size, storage size, processor type, etc.). By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set. Because the composition request is associated with the edge, the system control processor manager may identify one or more compute resource sets from one or more edge IHSs.

In step 504, at least one hardware resource set having hardware resources specified by the composition request is identified. The at least one hardware resource set may be identified similarly to that described with respect to the identified of the at least one compute resource set of step 502. For example, the computing resources requirements specified by the composition request may be matched to hardware resource sets. Because the composition request is associated with the edge, the system control processor manager may identify one or more hardware resource sets from one or more edge IHSs.

In step 506, SDS services are setup using at least one control resource set to obtain nodes. In one or more embodiments, the system control processor manager may set up the SDS services using the at least one control resource set to obtain multiple nodes that are required to implement the SDS services. For example, one SDS service may require three nodes, another SDS service may require four nodes, and so on. In addition to setting up the SDS services, the system control processor manager may set up additional management services without departing from embodiments disclosed herein. The management services may include, for example, virtualization, emulation, abstraction, indirection, duplicative writes, deduplication, compression, backup generation, and/or other type of services to meet the requirements of data integrity, security, and/or management models. The control resource set may provide at least a portion of the SDS services and/or the management services in conjunction with the at least one compute resource set and the at least one hardware resource set identified in steps 502 and 504.

The SDS services may be setup using the at least one control resource set to obtain nodes via the method of FIG. 5.2 without departing from the embodiments of the invention.

In step 508, a composed information handling system is instantiated to perform the SDS services using the nodes. In one or more embodiments disclosed herein, the logical hardware resources are presented to the nodes as bare metal resources using the at least one control resource set to instantiate the composed information handling system to service the composition request.

To present the logical hardware resources, the system control processor manager may instruct the system control processors of the at least control resource set to make the bare metal resources discoverable. For example, the at least one control resource set may send a bare metal communication to one or more processors of the at least one compute resource set to cause the processors to discover the presence of the presented bare metal resources. By doing so, the heterogeneous compute resources (e.g., processors and system control processors) of the nodes may then begin to utilize the logical hardware resources as bare metal resources resulting in a composed information handling system having all of the resources necessary to provide desired computer implemented services (i.e., the SDS services).

The method may end following step 508.

Using the method illustrated in FIG. 5.1, a composed information handling system may be formed using computing resources from one or more edge information handling systems and/or external resources.

In other embodiments disclosed herein, a user (e.g., system administrator) may manually compose an information handling system on edge IHSs by utilizing the underlying hardware and capabilities of the IHSs to provide SDS services on edge IHSs.

Following step 508 of FIG. 5.1, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIG. 5.2, FIG. 5.2 shows a flowchart of a method in accordance with one or more embodiments of the invention. The method of FIG. 5.2 may be performed to setup software defined storage services using at least one control resource set to obtain nodes for the SDS services. The method shown in FIG. 5.2 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, a number of nodes associated with the SDS is identified. In one or more embodiments, the system control processor manager may identify the number of nodes associated with the SDS based on the composition request obtained in step 500 of FIG. 5.1. As discussed above, the composition request may specify the SDS services to be performed by the composed information handling system. For example, the composition request may include an SDS identifier (e.g., a unique combination of alphanumeric characters), an SDS tag, or an SDS flag associated with a particular set of SDS services. In one or more embodiments, the composition request may further include the number of nodes associated with the particular SDS services. The system control processor manager may identify the number of nodes included in the composition request as the number of nodes associated with the SDS.

Alternatively, in other embodiments, the system control processor manager may include SDS information that may include a mapping between a particular set of SDS services and the number of nodes required by the SDS services. The system control processor manager may then match the particular set of SDS services included in the composition request with the corresponding particular set of SDS services in the SDS information. The system control processor manager may then identify the corresponding number of nodes included in the SDS information associated with the particular set of SDS services as the number of nodes associated with the SDS. The SDS information may be included in the outcome based computing resource requirements lookup table (e.g., 414, FIG. 4).

In step 512, heterogeneous compute resources are allocated to each node. As discussed above, the compute resource set may include compute resources included on edge IHSs. Each edge IHS may include only a limited quantity of compute resources (e.g., processors). Each node may require at least one compute resource to perform a portion of the SDS services associated with the node. However, the compute resource set of the edge IHSs may not include a sufficient quantity of computing resources to satisfy the computing requirements for each node of the SDS cluster. Accordingly, in such scenarios, one or more control resources of the at least one control resource set may also be allocated as computing resources of the SDS nodes. Therefore, the heterogeneous compute resources may include compute resources of the at least one compute resource set and control resources of the at least one control resource set. As a result, the system control processor manager may allocate heterogeneous compute resources to each node of the SDS nodes to satisfy the lack of compute resources available on edge IHSs.

In other embodiments, the at least one compute resource set may further include one or more hardware resources of one or more external resources that may be used as compute resources. These hardware resources may include special purpose devices, storage device controllers, etc. As a result, these hardware resources of the external resources may also be included along with the compute resources of the compute resource set and the control resources of the control resource set in the heterogeneous compute resources. Accordingly, these hardware resources of the external resources may also be allocated to nodes of the SDS nodes.

In step 514, power domains are allocated to each node. In one or more embodiments, each IHS node may include multiple power domains. Each compute resource of the heterogeneous compute resource may be associated with a separate power domain. The edge IHSs may be configured with separate power domains. A power domain may refer to a group of computing resources that share a common power supply. Accordingly, the system control processor manager may allocate to the node the power domain associated with the heterogeneous compute resource allocated to the node. As a result, each node may be associated with a different power domain. Therefore, each node may be independently powered and power fault tolerance may be maintained. Consequently, when one or more nodes of the SDS cluster experiences a power failure, other nodes may not be affected and SDS services may continue to be performed without failure on the remaining nodes. The power domains and the resources (e.g., compute resources, control resources, and/or hardware resources) included in each power domain may be specified in the telemetry data map (e.g., 412, FIG. 4).

In step 516, portions of the at least one hardware resource set are allocated to each node. In one or more embodiments, the system control processor manager may allocate a portion of the hardware resources that satisfy the hardware resource requirements for a node to each node based on the power domains. Each power domain may include a portion of the hardware resources of an edge IHS or external resource. Accordingly, the system control processor manager may allocate a portion of the hardware resources to a node to satisfy the node hardware requirements of the node using hardware resources of the same power domain allocated to the node. The system control processor manager may allocate portions of the hardware resources to the node using the telemetry data map (e.g., 412, FIG. 4), the composition request in step 500 of FIG. 5.1, and/or the outcome based computing resource requirements lookup table (e.g., 414, FIG. 4). The composition request and/or the outcome based computing resource requirements lookup table may include SDS information associated with the SDS as discussed above. The SDS information may further include the hardware resource requirements associated with each of the nodes of the SDS cluster.

In step 518, the nodes are prepared to perform the SDS services. To prepare the nodes of the SDS cluster to perform the SDS services, the system control processor manager may cooperate with the at least one control resource set. For example, the system control processor manager may generate instructions and/or a node image associated with the SDS workload for implementing the SDS services, encapsulate the instructions and image in a message, and send the message to the heterogeneous compute resource of each node. In response to receiving the message, the heterogeneous compute resource of each node may implement the instructions and instantiate the node image thereby implementing any number of SDS services and other management services such as performing erasure coding, replication, data mirroring, deduplication, and/or compression of data generated on applications executing on the composed information handling system using the SDS nodes.

In one or more embodiments, the system control processor manager may vary the size and/or complexity of the SDS workload associated with the SDS services allocated to be performed by each SDS node. The system control processor manager may normalize the storage capacity and compute capacity associated with each node and use the amount of storage capacity and compute capacity associated with each node to allocate portions of the SDS service workload to the SDS nodes. The system control processor manager may allocate compute intensive portions of the SDS workload to SDS nodes that include compute resources or special purpose devices (e.g., processors, graphics processing units, etc.) and may allocate less intensive portions of the SDS workload to SDS nodes that include control resources (e.g., system control processors). Similarly, the system control processor manager may allocate more storage intensive portions of the SDS workload to SDS nodes with more storage capacity and less storage intensive portions of the SDS workloads to SDS nodes with less storage capacity. For example, the system control processor manager may allocate chunk generation, parity chunk calculation, and chunk rebuilding portions of the SDS services to SDS nodes that include compute resources while only allocating chunk storage and retrieval to SDS nodes that include control resources (e.g., system control processors) or low compute external resources (e.g., storage device controllers).

The system control processor manager may also include identification information for the heterogeneous compute resources of SDS nodes that will cooperate in presenting resources as part of instantiating a composed information handling system and performing SDS services and management services. Consequently, the heterogeneous compute resources that will facilitate bare metal presentation of resources to SDS nodes of the composed information handling system and perform SDS services may be able to identify each other, communicate with each other, etc.

In one or more embodiments disclosed herein, the method ends following step 518.

In addition to steps 510-518, the system control processor manager may also setup other management services. Setting up other management services for the hardware resource set may include, for example, preparing translation, indirection, or abstraction tables used to translate logical addresses provided by compute resource sets to physical addresses utilized by hardware devices of the hardware resource.

In another example, setting up other management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, setting up other management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up the SDS services and the other management services may further include modifying the operation of one or more devices to provide SDS functionalities. Other functionalities may include, for example, data integrity functionality (e.g., RAID, ECC, etc.), security functionality (e.g., encryption), and/or other functionalities that are transparent to the composed information handling system.

Using the method illustrated in FIG. 5.2, management services including SDS services may be setup by allocating SDS nodes using the at least one hardware resource set, the at least one control resource set, and the at least one compute resource set to provide SDS services that are fault tolerant based on power domains and transparent to applications executing on the composed information handling system.

To further clarify embodiments of the invention, a non-limiting example is provided in FIGS. 6.1-6.4. FIGS. 6.1 and 6.4 shows a system similar to that illustrated in FIG. 1.1. For the sake of brevity, only a limited number of components of the system of FIGS. 1.1-4 is illustrated in FIGS. 6.1 and 6.4. FIGS. 6.2-6.3 show diagrams of examples of data structures utilized by the example system of FIGS. 6.1 and 6.4.

EXAMPLE

Consider a scenario as illustrated in FIG. 6.1 in which a client (not shown) sends a composition request to a system control processor manager (600) that manages two edge information handling systems, edge information handling system (IHS) A (610) and edge IHS B (624) and an external resource (638). The composition request specifies that a composed information handling system is to be instantiated to perform a SDS services. The SDS services include performing erasure coding using an SDS cluster that includes five nodes.

In response to the composition request, the system control processor manager (600), at step 2, identifies computing resources to be allocated to the composed information handling system using the table illustrated in FIG. 6.3. As seen in FIG. 6.3, the outcome based computing resource requirements lookup table (684) includes an erasure coding SDS entry (e.g., 686) associated with SDS services included in the composition request.

The SDS entry (686) is used by the system control processor manager (600) to ascertain the computing resource requirements for the composed information handling system. For example, the SDS entry (686) specifies compute resources (687), control resources (688), and hardware resources (689) need to be allocated to the composed information handling system to have the composed information handling system be capable of performing the workload associated with a SDS services. The compute resources (687) specified by the entry includes five nodes of an SDS cluster. Although not shown in FIG. 6.3 for brevity, the compute resources further specify that each node is to include one processor and one gigabyte of memory. The control resources (688) includes SDS services for data generated and/or stored in the composed information handling system, and the hardware resources (668) include five total terabytes of solid state disk space with each node including one terabyte. Using the information included in the SDS entry (686), the system control processor manager (600) identifies corresponding compute, control, and hardware resource sets for allocation to the composed information handling system using a telemetry data map (654) as illustrated in FIG. 6.2.

As seen in FIG. 6.2, the telemetry data map (654) includes entries (656, 666, 676) that specify the resource sets and corresponding hardware devices of these resource sets of IHS A (e.g., 610, FIG. 6.1), IHS B (e.g., 624, FIG. 6.1), and the external resource (e.g., 638, FIG. 6.1). For example, the telemetry data map (654) includes an entry (656) associated with IHS A (610, FIG. 6.1) which specifies that IHS A (610, FIG. 6.1) includes a compute resource set (658) that includes a processor and memory, a control resource set (660) that includes a system control processor, and a hardware resource set (662) that includes four solid state disk sets each have one terabytes of storage space. The IHS A entry (656) further specifies that the IHS type associated with IHS A (610, FIG. 6.1) is an edge IHS type (664) and the two power domains associated with IHS A (610, FIG. 6.1), power domain A (644, FIG. 6.1) and power domain B (646, FIG. 6.1) (not shown in FIG. 6.2). The IHS A entry (656) further specifies that power domain A (644) includes compute resource A (612, FIG. 6.1), solid state disk set A (616, FIG. 6.1), and solid state disk set C (620, FIG. 6.1), and power domain B (646, FIG. 6.1) includes system control processor A (614, FIG. 6.1), solid state disk set B (618, FIG. 6.1), and solid state disk set D (622, FIG. 6.1) (not shown in FIG. 6.2).

The telemetry data map (654) also includes an entry (666) associated with IHS B (624, FIG. 6.1) which specifies that IHS B (624, FIG. 6.1) includes a compute resource set (668) that includes a processor and memory, a control resource set (670) that includes a system control processor, and a hardware resource set (672) that includes a four solid state disk sets that have one terabytes of storage space each. The IHS B entry (666) further specifies that the IHS type associated with IHS B (624, FIG. 6.1) is an edge IHS type (674) and the two power domains associated with IHS B (624, FIG. 6.1), power domain C (648, FIG. 6.1) and power domain D (650, FIG. 6.1) (not shown in FIG. 6.2). The IHS B entry (666) further specifies that power domain C (648, FIG. 6.1) includes compute resource B (626, FIG. 6.1), solid state disk set E (630, FIG. 6.1), and solid state disk set G (634, FIG. 6.1), and power domain D (650, FIG. 6.1) includes system control processor B (628, FIG. 6.1), solid state disk set F (632, FIG. 6.1), and solid state disk set H (636, FIG. 6.1) (not shown in FIG. 6.2).

The telemetry date map (654) finally includes an entry (676) associated with the external resource (638, FIG. 6.1) which specifies that the external resource (638, FIG. 6.1) includes an external resource compute set (680) that includes a processor and memory and an external resource hardware set (682) that includes a solid state disk set (682) that includes one terabyte of storage. The external resource entry (676) further specifies that the external resource includes one power domains, power domain E (652, FIG. 6.1) (not shown in FIG. 6.2). The external resource entry (676) further specifies that power domain E (652, FIG. 6.1) includes an external resource controller (640, FIG. 6.1) and solid state disk I (642, FIG. 6.1) (not shown in FIG. 6.2).

Returning to FIG. 6.1, based on the information included in the tables illustrated in FIGS. 6.2 and 6.3, the system control processor manager (600) determines that a composed information handling system should be instantiated that includes five nodes of an SDS cluster. The system control processor manager (600) determines that the compute resource set should include compute resource A (612), compute resource B (626) and external resource controller (640). The system control processor manager (600) determines that the control resource set should include system control processor A (614) and system control processor B (628). The system control processor manager (600) determines that the hardware resource set should include solid state disk sets A-I (616, 618, 620, 622, 630, 632, 634, 636, and 642). After that, the system control processor manager determines that five SDS nodes need to be allocated using the aforementioned compute resource set, control resource set, and hardware resource set.

The system control processor manager (600) then allocates heterogeneous compute resources to each node. The system control processor manager (600) allocates compute resource A (612) to a first node, system control processor A (614) to a second node, compute resource B (626) to a third node, system control processor B (628) to a fourth node, and external resource controller (640) to fifth node. Based on the allocated heterogeneous compute resources allocated to each node, the system control processor manager (600) then allocates the power domains to each node. Accordingly, the system control processor manager (600) allocates power domain A (644) to the first node, power domain B (646) to the second node, power domain C (648) to the third node, power domain D (650) to the fourth node, and power domain E (652) to the fifth node. Finally, the system control processor manager (600) allocates portions of the hardware resource set to each node based on the power domains and the hardware resource requirements of the nodes. Each node is to include only one terabyte of storage space. Therefore, the system control processor manager (600) allocates solid state disk set A (616) to the first node, solid state disk set B (618) to the second node, solid state disk set E (630) to the third node, solid state disk set F (632) to the fourth node, and solid state disk set I (642) to the fifth node.

Based on the aforementioned determinations, a message, indicating the five nodes and their allocated resources is sent to system control processor A (614) by the system control processor manager (600). The message indicates each node and the resources allocated to each node. In response to obtaining the message, system control processor A (614) determines that one terabyte of solid state disk set A (616) should be presented by virtualizing a terabyte of solid state disk set A (616) to generate storage resource A. Additionally, system control processor A (614) determines that another one terabyte of solid state disk set B (618) should be presented by virtualizing a terabyte of solid state disk set B (618) to generate storage resource B. System control processor A (614) generates a first appropriate address translation table associated with storage resource A to present the one terabyte of storage as storage resource A. System control processor A (614) also generates a second appropriate address translation table associated with storage resource B. System control processor A (614) uses the first and second appropriate address tables to obtain storage resource A and storage resource B for the first node and the second node.

System control processor A (614) next determines that an additional nodes are to be generated using IHS B (624). Therefore, system control processor A (614) forwards the message obtained from the system control processor manager (600) specifying the nodes and the allocations associated with the nodes to system control processor B (628) to provide the third and fourth nodes. In response to obtaining the message, system control processor B (628) determines that one terabyte of solid state disk set E (630) should be presented by virtualizing a terabyte of solid state disk set E (630) to generate storage resource E. Additionally, system control processor B (628) determines that another one terabyte of solid state disk set F (632) should be presented by virtualizing a terabyte of solid state disk set F (632) to generate storage resource F. System control processor B (628) generates a third appropriate address translation table associated with storage resource E to present the one terabyte of storage as storage resource E. System control processor B (628) also generates a fourth appropriate address translation table associated with storage resource F. System control processor B (628) uses the third and fourth appropriate address tables to obtain storage resource E and storage resource F for the third node and the fourth node. System control processor B (628) also sends a message to the external resource controller (640) to generate a storage resource I using solid state disk set I (642) to generate storage I for the fifth node via the methods discussed above.

System control processor A (614) may also send instructions for executing SDS node applications to compute resource set A (612) and system control processor B (628). The instructions were obtained from the system control processor manager 600). System control processor B (628) then forwards the instructions to compute resource B (626) and the external resource controller (640). System control processor A (614) and system control processor B (628) may then instantiate the composed information handling system using the instructions and the address translation tables.

Turning to FIG. 6.4, the composed information handling system include all five SDS nodes: SDS node A (691), SDS node B (692), SDS node C (693), SDS node D (694), and SDS node E (695). SDS node A (691) includes compute resource A (612) and storage resource A (616). SDS node B (692) includes system control processor A (614) and storage resource B (618). SDS node C (693) includes compute resource B (626) and storage resource E (630). SDS node D (694) includes system control processor B (628) and storage resource F (632). SDS node E (695) includes external resource controller (640) and storage resource I (642). Each of the five SDS nodes perform a portion of the SDS services. That is, the five SDS nodes of the composed information handling system perform erasure coding.

End of Example

Thus, as illustrated in FIGS. 6.1-6.4, embodiments of the invention may provide a system that enables the composed system to SDS services on edge IHSs with limited resource availability while maintaining fault tolerance and redundancy required by the SDS services.

Figure 7:
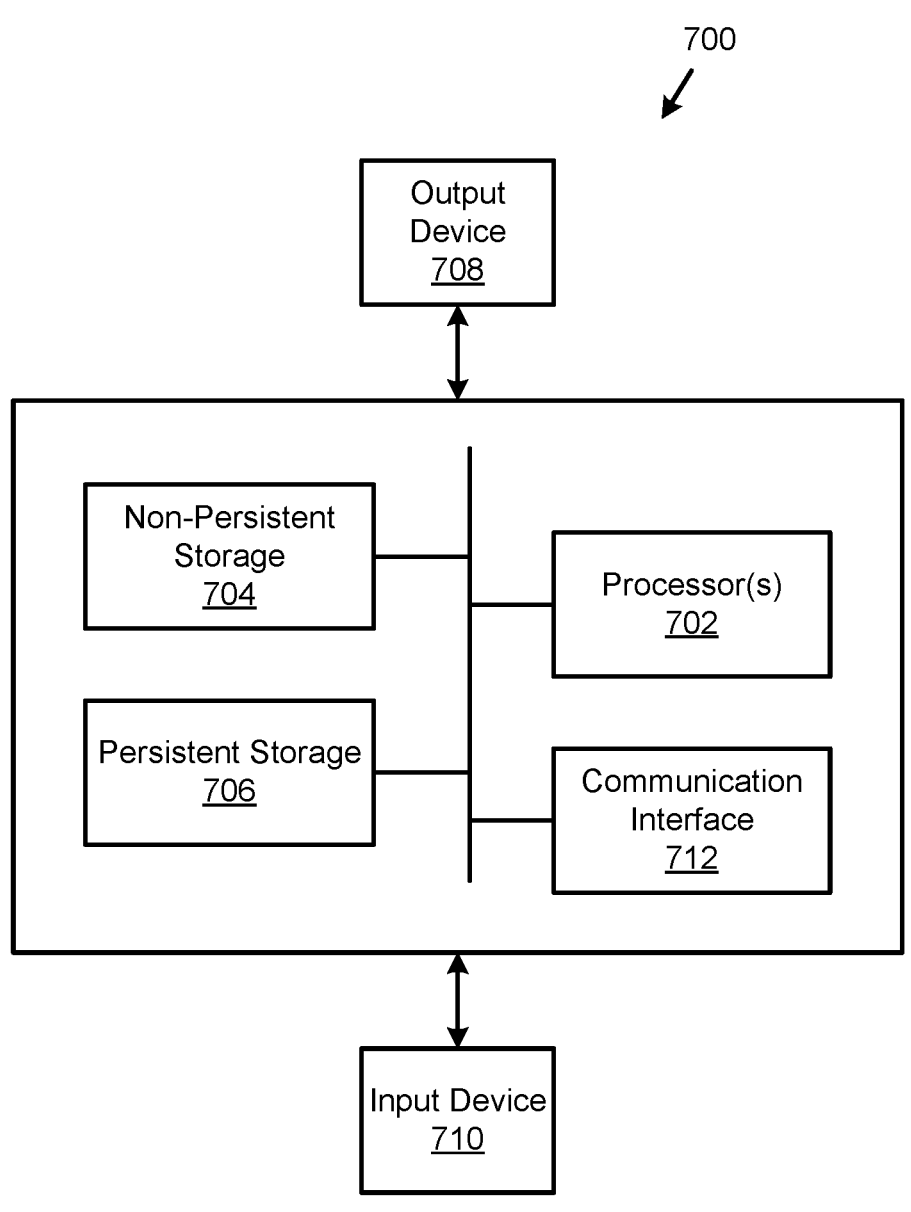
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for providing software defined storage services on edge information handling systems, comprising:

obtaining a composition request for a composed information handling system (IHS) associated with performing a software defined storage (SDS) service on edge IHSs, wherein:

the composition request specifies the SDS service, and the SDS service is associated with a minimum quantity of SDS nodes that is greater than a quantity of available edge IHSs;

identifying a first IHS and a second IHS specified by the composition request, wherein the first IHS and the second IHS comprise edge IHSs;

setting up SDS services using the first IHS and the second IHS to obtain SDS nodes, wherein setting up SDS services to obtain SDS nodes comprises:

identifying a number of nodes associated with the SDS nodes;

allocating heterogeneous compute resources of the first IHS and the second IHS to each SDS node of the SDS nodes;

allocating a power domain to each SDS node of the SDS nodes;

allocating portions of an at least one hardware resource set to each SDS node of the SDS nodes; and preparing the SDS nodes to perform the SDS service; and instantiating a composed information handling system to perform the SDS service using the SDS nodes.

2. The method of claim 1, wherein the SDS service comprises performing erasure coding.

3. The method of claim 1, wherein:

the at least one hardware resource set comprises hardware resources of the first IHS and the second IHS.

4. The method of claim 1, wherein each SDS node is associated with a different power domain to provide power fault tolerance.

5. The method of claim 1, wherein allocating heterogeneous compute resources of the first IHS and the second IHS to each SDS node comprises:

allocating a first compute resource of the first IHS to a first SDS node of the SDS nodes;

allocating a first control resource of the first IHS to a second SDS node of the SDS nodes;

allocating a second compute resource of the second IHS to a third SDS node of the SDS nodes; and allocating a second control resource of the second IHS to a fourth SDS node of the SDS nodes.

6. The method of claim 5, wherein the heterogeneous compute resources comprise the first compute resource, the second compute resource, the first control resource, and the second control resource.

7. The method of claim 5, wherein:

the first control resource comprises a first system control processor and the second control resource comprises a second system control processor; and the first compute resource comprises a first processor with processor dedicated memory and the second compute resource comprises a second processor with processor dedicated memory.

8. The method of claim 5, wherein allocating portions of the at least one hardware resource set to each node comprises:

allocating a first portion of hardware resources of the first IHS to the first node;

allocating a second portion of hardware resources of the first IHS to the second node;

allocating a first portion of hardware resources of the second IHS to the third node; and allocating a second portion of hardware resources of the second IHS to the fourth node.

9. A system for providing software defined storage services on edge information handling systems, comprising:

a processor that executes an application of the applications; and a system control processor manager, comprising memory and a second processor, programmed to:

obtain a composition request for a composed information handling system (IHS) associated with performing a software defined storage (SDS) service on edge IHSs, wherein:

the composition request specifies the SDS service, and the SDS service is associated with a minimum quantity of SDS nodes that is greater than a quantity of available edge IHSs;

identify a first IHS and a second IHS specified by the composition request, wherein the first IHS and the second IHS comprise edge IHSs;

set up SDS services using the first IHS and the second IHS to obtain SDS nodes, wherein setting up SDS services to obtain SDS nodes comprises:

identifying a number of nodes associated with the SDS nodes;

allocating heterogeneous compute resources of the first IHS and the second IHS to each SDS node of the SDS nodes;

allocating a power domain to each node of the nodes;

allocating portions of an at least one hardware resource set to each SDS node of the SDS nodes; and preparing the SDS nodes to perform the SDS service; and instantiate a composed information handling system to perform the SDS service using the SDS nodes.

10. The system of claim 9, wherein the SDS service comprise performing erasure coding.

11. The system of claim 9, wherein:

the at least one hardware resource set comprises hardware resources of the first IHS and the second IHS.

12. The system of claim 9, wherein each node of the nodes is associated with a different power domain to provide power fault tolerance.

13. The system of claim 9, wherein allocating heterogeneous compute resources of the first IHS and the second IHS to each SDS node comprises:

allocating a first compute resource of the first IHS to a first SDS node of the SDS nodes;

allocating a first control resource of the first IHS to a second SDS node of the SDS nodes;

allocating a second compute resource of the second IHS to a third SDS node of the SDS nodes; and allocating a second control resource of the second IHS to a fourth SDS node of the SDS nodes.

14. The system of claim 13, wherein the heterogeneous compute resources comprise the first compute resource, the second compute resource, the first control resource, and the second control resource.

15. The system of claim 13, wherein:

the first control resource comprises a first system control processor and the second control resource comprises a second system control processor; and the first compute resource comprises a first processor with processor dedicated memory and the second compute resource comprises a second processor with processor dedicated memory.

16. A non-transitory computer readable medium comprising computer readable program code, which when executed by a computer processor enables the computer processor to perform a method for providing software defined storage services on edge information handling systems, the method comprising:

obtaining a composition request for a composed information handling system (IHS) associated with performing a software defined storage (SDS) service on edge IHSs, wherein:

the composition request specifies the SDS service, and the SDS service is associated with a minimum quantity of SDS nodes that is greater than a quantity of available edge IHSs;

identifying a first IHS and a second IHS specified by the composition request, wherein the first IHS and the second IHS comprise edge IHSs;

setting up SDS services using the first IHS and the second IHS to obtain SDS nodes, wherein setting up SDS services to obtain the SDS nodes comprises:

identifying a number of nodes associated with the SDS nodes;

allocating heterogeneous compute resources of the first IHS and the second IHS to each SDS node of the SDS nodes;

allocating a power domain to each SDS node of the SDS nodes;

allocating portions of an at least one hardware resource set to each SDS node of the SDS nodes; and preparing the SDS nodes to perform the SDS service; and instantiating a composed information handling system to perform the SDS service using the SDS nodes.

17. The non-transitory computer readable medium of claim 16, wherein the SDS service comprise performing erasure coding.

18. The non-transitory computer readable medium of claim 16, wherein:

the at least one hardware resource set comprises hardware resources of the first IHS and the second IHS.

19. The non-transitory computer readable medium of claim 16, wherein each SDS node of the SDS nodes is associated with a different power domain to provide power fault tolerance.

20. The non-transitory computer readable medium of claim 16, wherein allocating heterogeneous compute resources of the first IHS and the second IHS to each SDS node comprises:

allocating a first compute resource of the first IHS to a first SDS node of the SDS nodes;

allocating a first control resource of the first IHS to a second SDS node of the SDS nodes;

allocating a second compute resource of the second IHS to a third SDS node of the SDS nodes; and allocating a second control resource of the second IHS to a fourth SDS node of the SDS nodes.

* * * * *